United States Patent
Faircloth, Jr.

[19]

[11] Patent Number: 5,820,751
[45] Date of Patent: Oct. 13, 1998

[54] WATER SKIMMING APPARATUS FOR THE CONTROL OF SEDIMENT POLLUTION

[76] Inventor: Jesse Warren Faircloth, Jr., 1302 Farmview Rd., Hillsborough, N.C. 27278

[21] Appl. No.: 753,525

[22] Filed: Nov. 26, 1996

[51] Int. Cl.[6] .................................................. B01D 21/24
[52] U.S. Cl. ........................ 210/122; 210/242.1; 210/540
[58] Field of Search ................................ 210/122, 242.1, 210/242.3, 540, 923

[56] References Cited

U.S. PATENT DOCUMENTS

| | | | |
|---|---|---|---|
| 882,030 | 3/1908 | Travlson et al. | 210/242.1 |
| 1,107,391 | 8/1914 | Welch | 210/242.3 |
| 1,450,545 | 4/1923 | Hans | 210/122 |
| 2,330,508 | 9/1943 | McCon | 210/242.3 |
| 2,858,843 | 11/1958 | Muller | 210/122 |
| 2,957,579 | 10/1960 | McCombie | 210/242.1 |
| 4,405,458 | 9/1983 | McHugh, Jr. | 210/242.3 |
| 4,892,666 | 1/1990 | Paulson | 210/540 |
| 4,906,366 | 3/1990 | Moore | 210/242.3 |
| 4,973,405 | 11/1990 | Kozey | 210/242.1 |
| 5,113,889 | 5/1992 | McGuire, Jr. | 137/2 |

OTHER PUBLICATIONS

Paper entitled "Automatic Device for Emptying a Detention Pond at a Constant Floe Rate and Velocity" by Joseph Adler, 1981.

Paper entitled "Experimental Dewatering Device to Improve Sediment Basin Efficiency" by Warren Faircloth, 1995.

*Primary Examiner*—Christopher Upton
*Attorney, Agent, or Firm*—Olive & Olive, P.A.

[57] ABSTRACT

The apparatus of the invention has a float portion, a drain head portion, and an outlet pipe portion which are sequentially connected. The float pivotally supports the drain head slightly below the surface of water in a sediment basin. The outlet pipe is connected rigidly to the drain head at the inlet end and flexibly to a drain line at the outlet end. As the water fills and is drained from the sediment basin, the float and drain head are gradually raised and lowered and the outlet pipe approaches horizontal. The float surrounds the drain head and has a debris guard which is pivotally mounted to keep a gap preventing debris from entering the outlet pipe closed. An orifice within the outlet pipe and an air vent connected thereto are variable to control the water flow rate from the basin.

10 Claims, 5 Drawing Sheets

WATER SKIMMING APPARATUS FOR THE CONTROL OF SEDIMENT POLLUTION

BACKGROUND OF THE INVENTION

1. Field of the Invention

This invention relates to sediment pollution control and more particularly to control systems employing a sediment basin and skimmer apparatus to control filling and draining of the basin.

2. Description of the Related Art

When soil is exposed by the removal of vegetation or other protective ground cover, it is subject to erosion by wind, rain, and flowing water. Erosion is a natural process that has shaped the surface of the earth, and the sediment loss is such that it is usually absorbed without much damage. However, erosion and sediment loss on land disturbances for constructing roads, housing, commercial development, or other uses can be tens of times the rate from farmland and hundreds of times the rate from forest land. Sediment resulting from uncontrolled erosion is a form of water pollution that can damage downstream properties and streams and harm aquatic habitat. This sediment pollution also fills storm drain pipes, streams, and rivers, decreasing their capacity and increasing the potential for flooding. Sediment fills water supply reservoirs and reduces useful storage capacity. In addition, other pollutants, such as nutrients and pesticides, attach to soil particles and are transported downstream with the sediment.

Sediment and erosion control regulations have been enacted in many localities as a partial solution to the problem of uncontrolled erosion on land disturbances. These regulations require sediment controls to be implemented to catch sediment laden runoff and retain sediment on the site to prevent damage downstream. One typical sediment control used where runoff is concentrated is a sediment basin composed of a dry impoundment below the land disturbance with an overflow structure at the outlet that controls the filling and draining of the basin. At the beginning of a rainfall event, the basin is empty but it fills, either partially or completely depending on the amount of rainfall and the volume of the resulting runoff, as sediment laden runoff enters. The standing water absorbs the energy of the flowing water entering the basin, causing much of the suspended soil particles to settle to the bottom of the impoundment. When the impoundment fills, it overflows through the outlet structure and flows off the site downstream through storm drains or natural or constructed channels. Hours or days after the storm, openings in the outlet allow the impoundment to drain so that its storage capacity is restored in preparation for the next rainfall.

Typical outlet structures for sediment basins are either a perforated vertical riser or standpipe or a low dam of large stones covered with a layer of much smaller stones on the upstream side. Typically the perforated riser or standpipe is used in large basins and the stone dam in smaller basins. Both types of outlet structures are intended to meter the flow of sediment laden water from the impoundment and cause the impoundment to fill, creating the desired pool of water to cause settling. After the rainfall event, the outlet structure drains the impoundment to restore its treatment volume for the next rainfall. Because the perforations in the riser or standpipe extend from the crest to the bottom and the stone dam is porous from the crest to the bottom, the impoundment drains water primarily from the bottom of the impoundment where the sediment has been deposited, and, as a result, often a considerable amount of sediment is drained away along with the water, causing sediment damage below the basin. In addition, the number and size of the perforations are neither designed or constructed to cause the impoundment to fill during low intensity rainfalls even if adequate runoff is generated. These imprecise perforations also fail to meter outflow so that the impoundment drains over a sufficient period of time that causes settling of most of the soil particles. A similar problem exists when the rock dam is used as the outlet because the porosity of the stone is not controlled to the necessary degree to properly meter outflow. As a result, larger basins are built to increase the amount of sediment caught but the potential is not achieved because the impoundment that is assumed to occur is frequently never created. Because of these deficiencies, typical sediment basins have been found to capture only less than 50% of the sediment entering the basin.

A solution to the shortcomings of the impoundment not properly filling and then draining sediment from the bottom would be an outlet structure that controlled the outflow so that the desired impoundment was created regardless of whether the rainfall was small or large. In addition, the impoundment would drain from near the surface so that only the least sediment-laden water in the basin is discharged. By placing a constant head on the inlet, uniform flow could be provided so that the time to drain the basin could be controlled to achieve an improved degree of settling.

A particular type of system intended to solve this problem is described in a paper entitled *Automatic Device For Emptying A Detention Pond At A Constant Low Flow Rate And Velocity,* by Joseph Adler, which was presented at the International Symposium on Urban Hydrology, Hydraulics and Sediment Control at the University of Kentucky, July, 1981. The Adler device has a long, flexible hose connected at the outlet end to a drain located at the lowest basin level. The hose inlet has an upwardly open weir, or skimmer, which is supported at a level slightly below the water level by a flotation device. As the water drains from the sediment basin, the float lowers with the water level and the weir is constantly supported slightly below the surface of the water. The flow rate in this known device is controlled by the diameter of the weir and the depth of water above the edge of the weir, assuming a constant head of water over the weir.

The present invention utilizes certain of the principles which are addressed in the Adler device and provides an improved, simplified, automatic draining device with a floating collection head and means to regulate the rate of flow when draining the basin without the need for a custom device for every basin.

It is therefore an object of this invention to provide an apparatus and method which operates automatically to allow the sediment basin to fill and then to drain the water for controlling sediment pollution.

It is a further object of this invention to provide an apparatus and method for the control of sediment pollution which is operative to control the flow rate of water being drained thereby so the basin fills to create desired quiescent conditions to cause settling of soil particles.

It is an additional object of this invention to provide an apparatus and method for the draining of the entire basin so that the accumulated sediment dries out between rainfalls so that it can be removed by excavation to restore the storage capacity of the basin so that its effectiveness is not reduced.

Other objects and advantage will be more fully apparent from the following disclosure and appended claims.

SUMMARY OF THE INVENTION

The invention provides a skimmer device which is pivotally supported on a float device so as to be positioned below and near the surface of water held in a sediment basin. The float device also acts as a barrier to substantially prevent debris which may be floating on the water surface from approaching and clogging the skimmer device. The skimmer includes a screen to further prevent the entry of debris and has a rest plate connected to support the skimmer off the mud bottom of the pond when the water has been removed. The skimmer also includes an orifice which is configured to control the rate of flow so as to allow adequate settling time for suspended matter in the water. The air vent is provided to work in conjunction with the orifice in controlling flow rate.

DETAILED DESCRIPTION OF THE INVENTION AND PREFERRED EMBODIMENTS THEREOF

Figure 1:
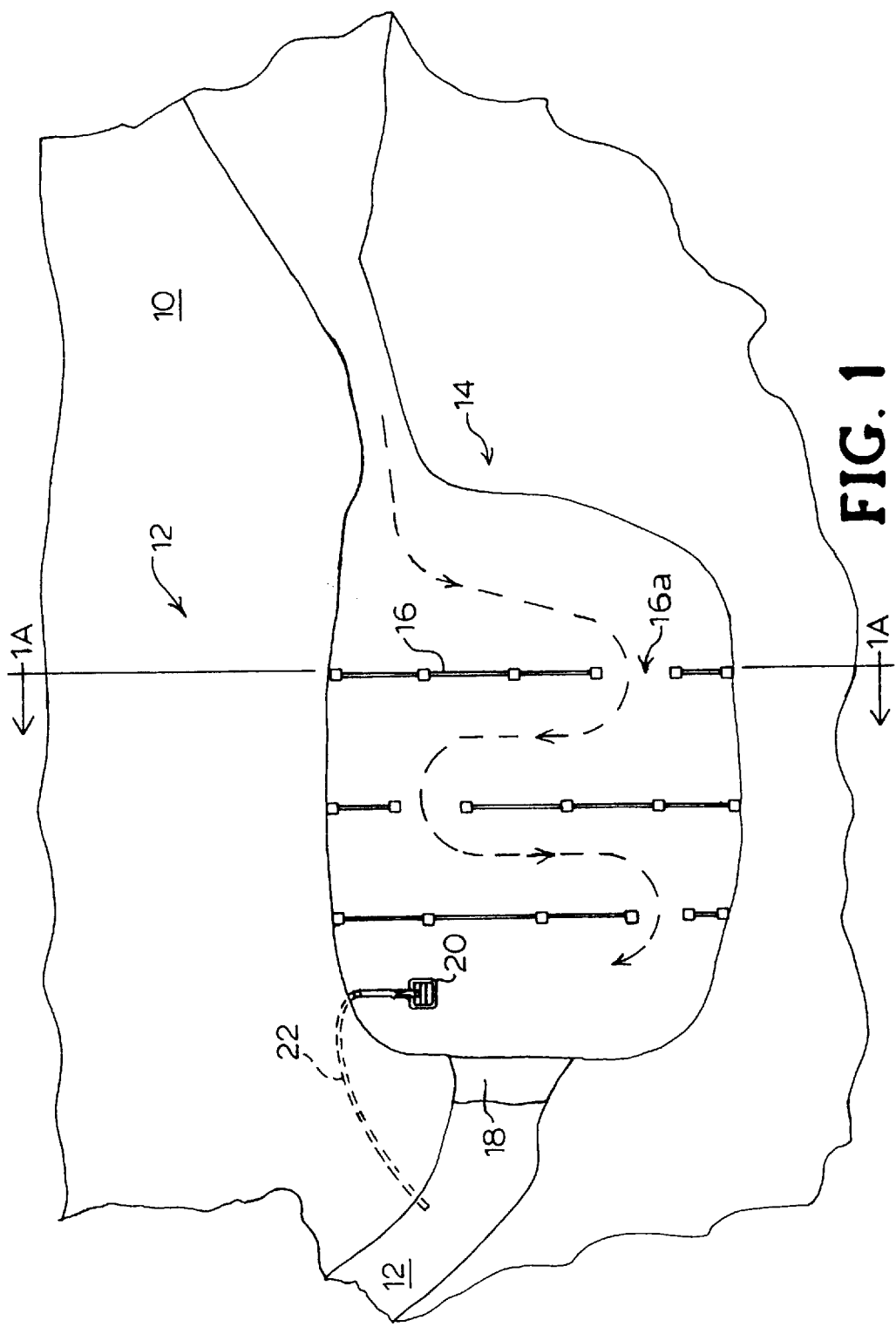
FIG. 1 is a plan view of a typical land disturbance site including a sediment basin in which the skimmer device of the invention is installed.

As described briefly above, FIG. 1 illustrates a typical land disturbance which has been prepared with a sediment basin 14 situated at a lower level, i.e. downstream from land disturbance site 10. When surface water accumulates on or flows over construction site 10, the excess water flows and erodes soil into sediment basin 14. A series of baffles 16 are installed in sediment basin 14 in an orientation substantially perpendicular to grade. Each baffle 16 extends several feet off the bottom of the basin to near the water level and each is broken with a gap 16a to permit flow of water. Gap 16a in each successive fence 16 is offset from the previous gap 16a in order to reduce the effective flow grade and increase the residence time of the saturated water in sediment basin 14, therefore maximizing natural precipitation of suspended matter, such as soil particulate. The flow path of the water is shown in FIG. 1 by dashed arrows. A weir or riser 18 is provided at the downstream end of sediment basin 14 to allow for overflow in case the volume of runoff exceeds the volume of basin 14. Weir 18 deposits overflow water into an existing channel or stream which can be routed to join with a sediment basin 14 removal facility, such as spillway 12.

Skimmer device 20 according to the invention is installed in a downstream portion of sediment basin 14. The downstream position is chosen as a location of deepest water from which the greatest portion of suspended soil has precipitated, so that the water which is removed by skimmer device 20 contains the lowest concentration of sediment in the basin. The output end of skimmer device 20 is connected adjacent the bottom of sediment basin 14 to drain line 22 which runs to spillway 12. The junction of drain line 22 and spillway 12 must be at a level lower than the lowest point within sediment basin 14 reached by skimmer device 20.

Figure 2:
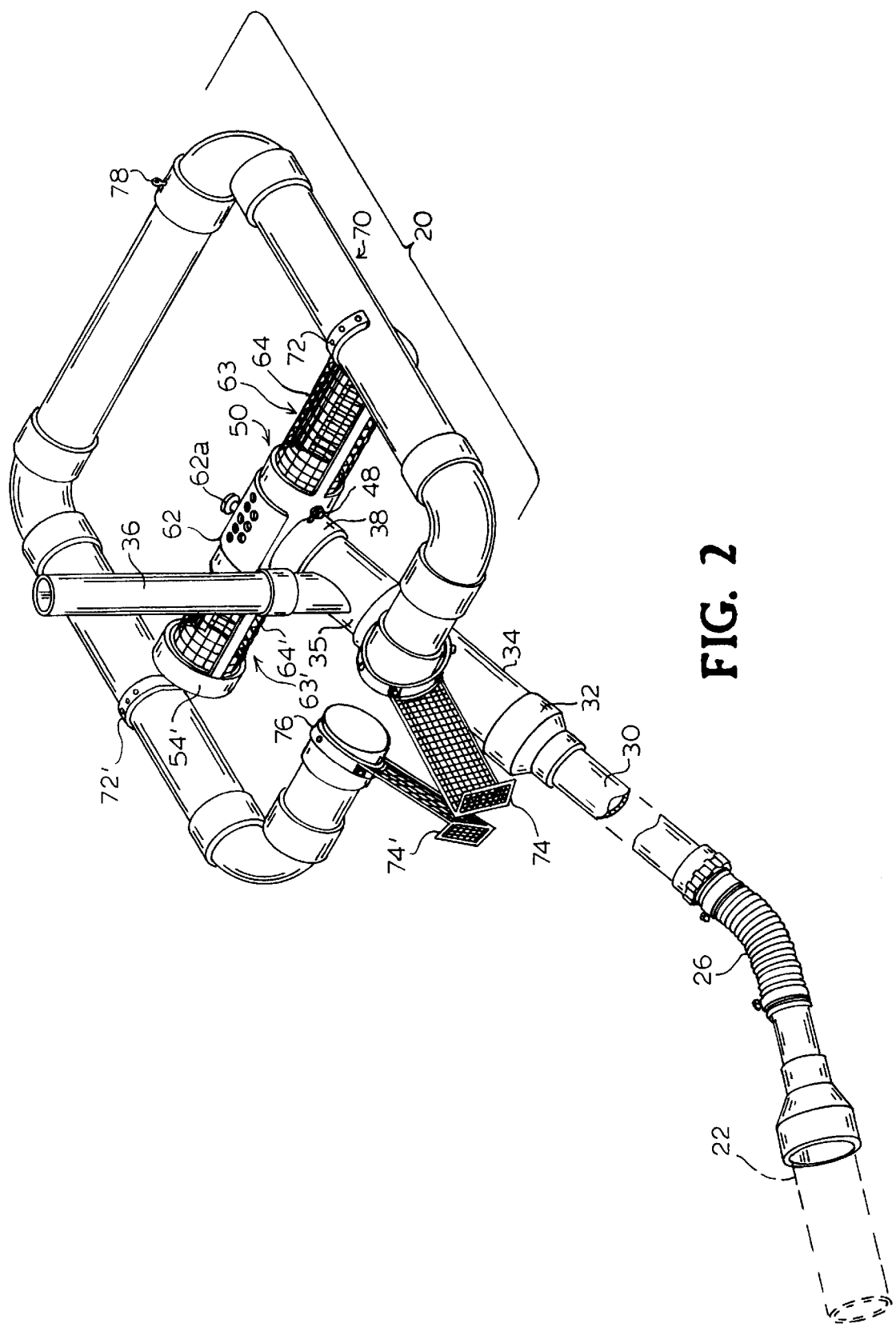
FIG. 2 is a perspective top view of the apparatus of the invention.

Details of skimmer device 20 are seen in perspective view in FIG. 2, showing the output of drain head 50 coupled through flow pipe 34 and control pipe 30 to a flexible hose 26 at the left end of skimmer device 20 connected to drain line 22. Skimmer device 20 has a float 70 to which drain head 50 is connected by means of a pair of mirror image strap-like supports 72 and 72' so as to rotate according to the depth of the water. An assembly of outlet pipes is provided, the first part of which is flow pipe 34, sealed to drain head 50 through "Y" connector 35 at one end and to relatively narrow flow control pipe 30 at the other end. An objective of providing a smaller diameter pipe to receive flow from a larger diameter pipe is to enable the smaller pipe to completely fill, thus approaching laminar flow efficiency. The larger diameter pipe also allows use of an orifice larger in diameter than smaller control pipe 30 so that the potential of the control pipe can be utilized by not restricting the orifice diameter to the size of the smaller control pipe. Flow pipe 34 connects to control pipe 30 by means of coupling 32. A section of flexible hose 26 connected to the outlet end of control pipe 30 allows float 70 to rise and fall according to the level of water in sediment basin 14. Appropriate components are connected to flexible hose 26 for ultimate discharge of the water into drain line 22. As will be apparent to those skilled in the art, the length of piping required from drain head 50 to drain line 22 will be primarily determined by the depth of water possible in the sediment basin being used. In the preferred embodiment illustrated, the components of the invention apparatus are primarily fabricated of polyvinylchloride (commonly known as PVC) piping with certain components being metal, such as supports 72 and 72' and screens 64 and 64'. This construction is economical by reason of the price to purchase parts, ease of machining, and reliable assembly with available adhesives. Benefits of this construction include skimmer weight, durability, resistance to rust and sunlight degradation.

Figure 3:
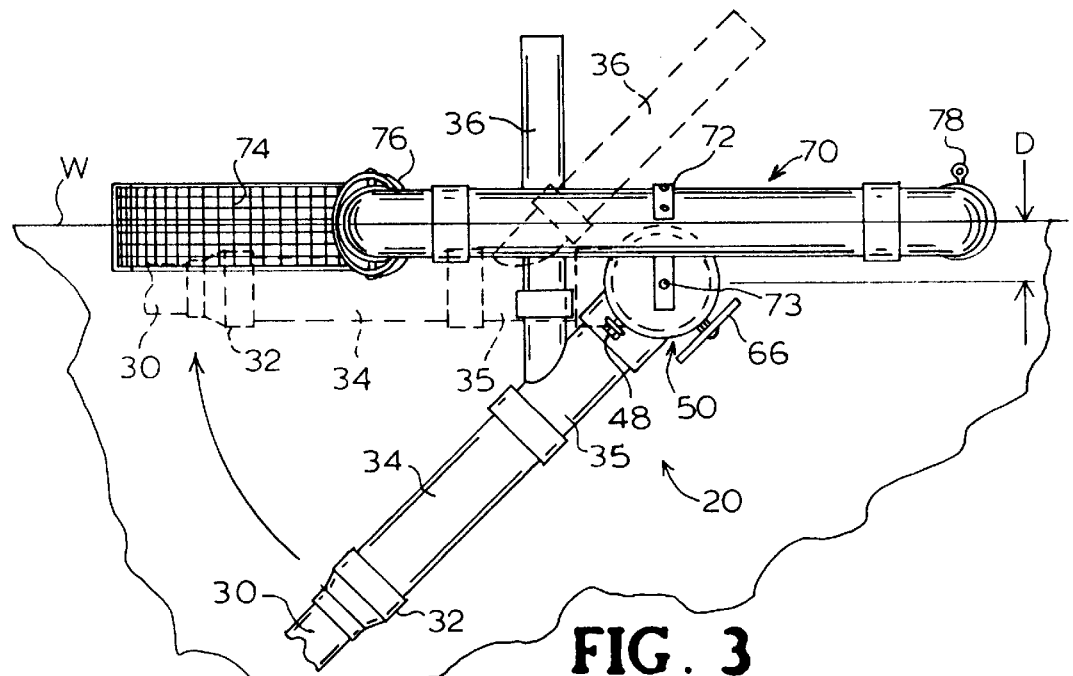
FIG. 3 is a partial side elevation view of the apparatus of the invention in operation in a sediment basin.

Flow pipe 34 is attached to "Y" connector 35 to which air vent 36 is fitted at approximately 45° to the axis of flow pipe 34 as shown in FIG. 3. Air vent 36 has a length sufficient to maintain its open end above the water surface regardless of the angular relation between flow pipe 34 and float 70. The upper end of air vent 36 is normally kept open. By allowing air to enter flow pipe 34 through air vent 36, flow pipe 34 will not totally fill with water, and then flow full or siphon, which in some cases would increase the flow rate above the desired rate. At times, flow pipe 34, control pipe 30, or both, will be only part full, which makes the apparatus more buoyant, which factor must be compensated as described below. The flow rate will be primarily controlled by the size of orifice 44 (FIG. 5), to be discussed below. When air vent 36 is closed, control pipe 30 will fill totally with water, thus increasing its flow efficiency and flow rate by virtue of achieving a laminar flow condition.

Float 70 is a rectangle or square formed of pipe and sized such that the buoyant force of the float is sufficient to maintain drain head 50 positioned proximally below the surface of water W (see FIG. 3), as indicated by depth D (see FIG. 3), typically 2–4 inches to the center on drain head 50. In addition to reliance of the buoyancy of float 70 to support the level of drain head 50, float 70 must be of sufficient weight to prevent the upward force of air in portions of the outlet pipe from lifting drain head 50 above the water level. As the water W is gradually skimmed from sediment basin 14, float 70 moves downward and flow pipe 34 approaches horizontal, as seen in dashed lines in FIG. 3. A pair of opposed, pivotally mounted debris guards 74 and 74' are mounted so as to be forced from their biased-together position illustrated in FIG. 2 to a separated position around flow pipe 34, shown in FIGS. 3 and 4. In this manner, debris guards 74 prevent or tend to prevent debris which may be floating on the surface of the water from getting inside the enclosure of float 70 and affecting the draining operation.

Figure 5:
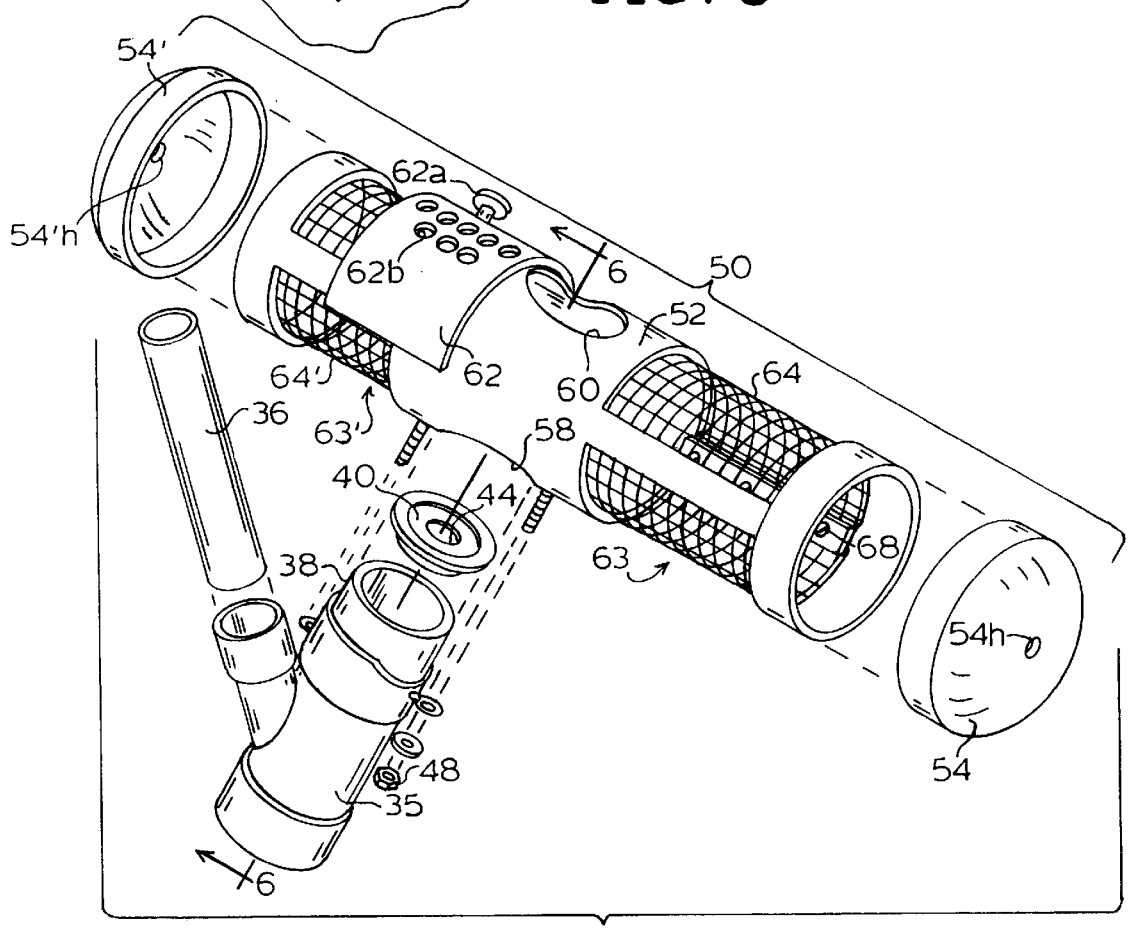
FIG. 5 is an exploded perspective view of the drain head of the skimmer device of the invention.
Figure 6:
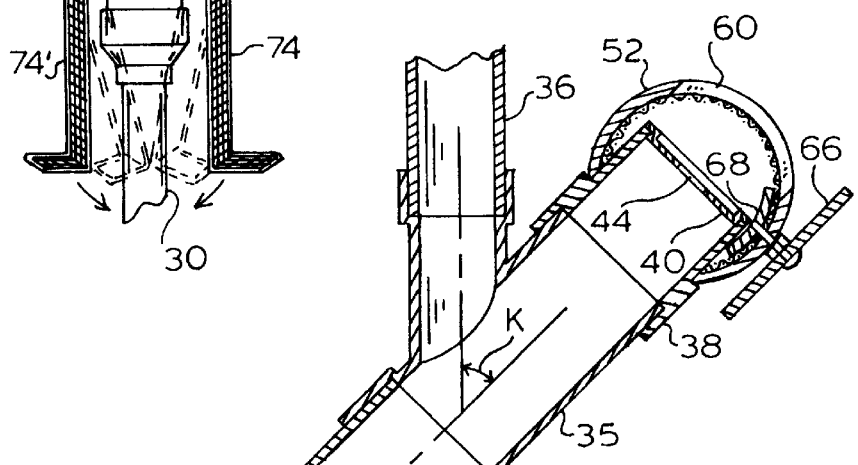
FIG. 6 is a cross sectional view of the drain head taken in the direction of line 6—6 of FIG. 5.

Greater detail of drain head 50 is seen by reference to FIG. 5 which portrays drain head 50 in exploded perspective view. Drain head 50 includes a number of components which are assembled to frame 52. Frame 52 is formed of a tube having a pair of aligned holes formed transversely across its longitudinal center line at its approximate mid-point, being pipe hole 58 and access hole 60. A pair of windows 63 and 63', are cut in diametrical opposition in frame 52 on each side of holes 58, 60 for the placement of screens 64 and 64'. A preferred configuration for each screen 64 and 64' is a ½ inch×½ inch mesh wire fabric which is rolled to a diameter adapted to fit snugly within frame 52 and of a length sufficient to extend from the respective end of frame 52 to a position short of holes 58, 60 so as not to block their openings. Screens 64 and 64' may, optionally, be secured in position within frame 52 by any conventional means, such as, for example, by clamp portion 68 (see FIG. 6). After screens 64 and 64' are installed from each end of frame 52, caps 54 and 54' are assembled on either end, typically without adhesive, to further prevent debris from entering drain head 50. Each of the caps 54 and 54' is formed with an axial hole 54*h* in which mounting stud 73 freely nests so as to permit head 50 to rotate relative to float 70 as water fills and is drained from sediment basin 14. A cover 62 is formed in a partially cylindrical sheet shape configured to frictionally grip frame 52. A knob 62*a* is connected to cover 62 in a manner so as to permit sliding lateral movement of cover 62 to open and close access hole 60. An array of holes 62*b* in cover 62 provide for additional passage of water into drain head 50.

Pipe hole 58 is of a diameter to receive an end of pipe coupling 38 therewithin. The opposite end of pipe coupling 38 is inserted into "Y" connector 35 which is contoured to properly position drain head 50 (see FIG. 6). Pipe coupling 38 is preferably held in engagement with drain head 50 by a pair of fasteners 48 which straddle pipe coupling 38 (only one fastener being shown). A plug 40 is configured to fit snugly into the end opening of pipe coupling 38, with orifice 44 formed substantially in the center of plug 40. In the preferred embodiment, the center of orifice 44 is positioned to align with the center of drain head 50 so as to remain at a constant depth below the surface of the water and achieve a substantially controlled flow rate. The diameter of orifice 44 has a direct effect on the flow rate of water passing through skimmer device 20, as more fully discussed below. A series of plugs with a diameter identical to that of plug 40, each formed with an orifice diameter different than the diameter of orifice 44, and formed to be readily interchangeable in the end of pipe coupling 38, are supplied with the skimmer device 20 to permit variable flow control for the skimmer of the invention. A particular benefit of orifice 44 restricting the rate of flow is to allow sediment basin 14 to fill comparatively quickly during a rainfall event and drain slowly so as to provide time for the sediment to settle. It is to be noted that when sediment basin 14 is near empty and skimmer device 20 is near horizontal, flow rate will be at a minimum. Access hole 60 is of a size to pass plug 40 therethrough and to service drain head 50. Plate 66 (see FIG. 3) is mounted to the lower exterior of drain head 50 in substantially parallel relation to flow pipe 34 to prevent drain head 50 from sinking into mud accumulated at the bottom of sediment basin 14 (FIG. 1), and mud from being siphoned together with water.

Figure 7:
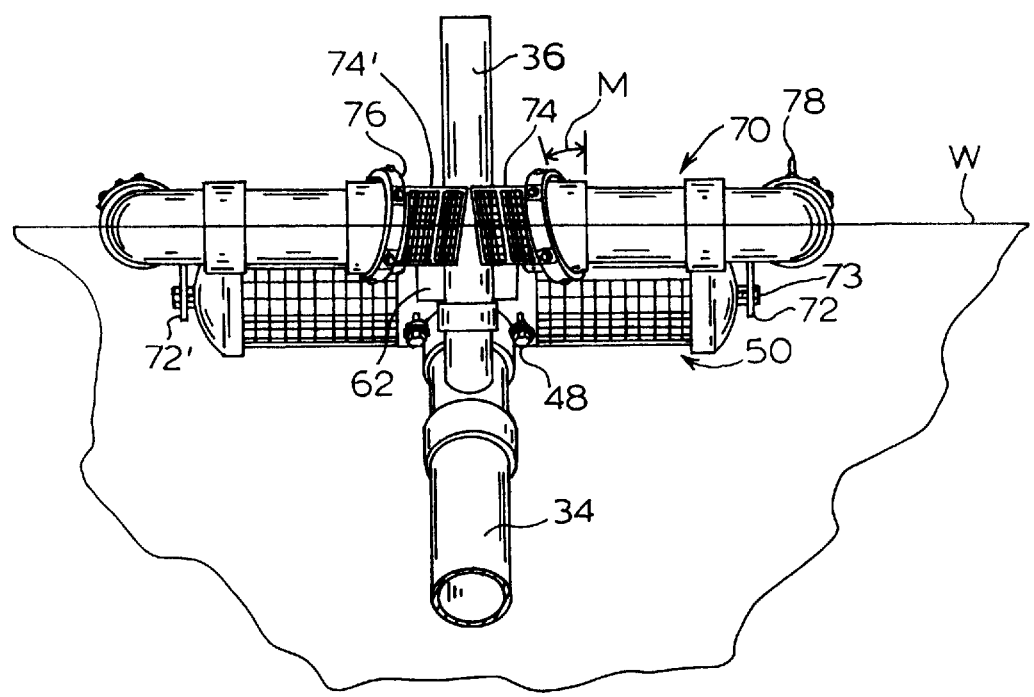
FIG. 7 is a rear elevation view of the drain head and the float of the invention.
Figure 1A:
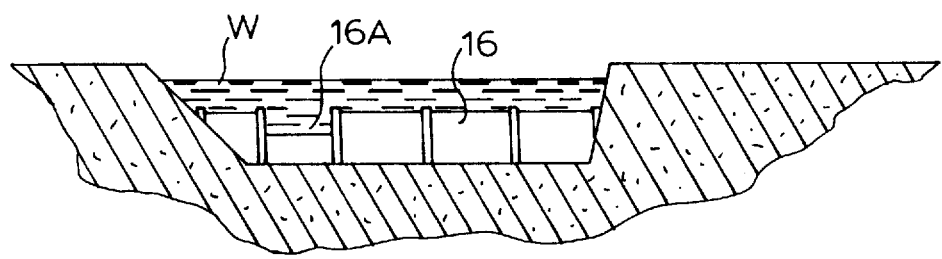
FIG. 1A is a cross sectional view of the sediment basin of FIG. 1 as taken in the direction of 1A—1A.
Figure 4:
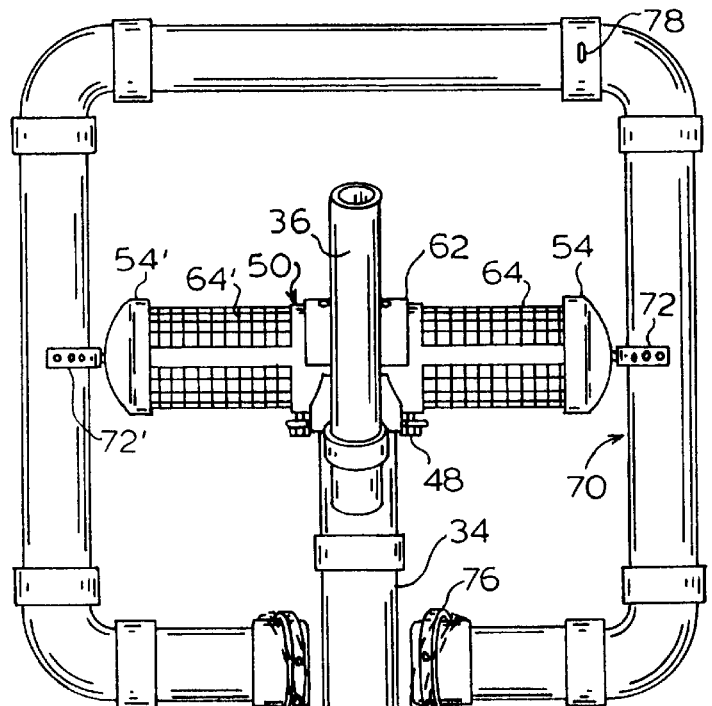
FIG. 4 is a top plan view of the operative portion of the skimmer device of the invention.

As seen in top elevation in FIG. 4 with flow pipe 34 positioned substantially parallel to float 70, debris guards 74 and 74' are spread to either side of flow pipe 34. Debris guards 74 and 74' are operative to complete the enclosure of the substantially open space surrounded by float 70. Debris guards 74 and 74' are each mounted on a ring 76 which is pivotally assembled to a closed end of float 70 at an angle M to vertical (see FIG. 7) so as to be biased toward each other, as illustrated in dashed lines in FIG. 4. For clarity, debris guards 74 and 74' are shown in solid lines out of contact with flow pipe 34. Debris guards 74 and 74' pivot closed when flow pipe 34 is angled downwardly, as shown in solid lines in FIG. 3, and pivot open when contacted by coupling 32 when flow pipe 34 is placed in a horizontal position, as shown in dashed lines in FIG. 3. The overall length of assembled drain head 50 is somewhat less than the inner dimension between opposed sides of float 70, and supports 72 and 72' are secured to float 70 to pivotally mount drain head 50. In the preferred embodiment, screws are used in a position above the water level to secure supports 72 and 72' to float 70. It is to be noted that the center of drain head 50 is held below the lowest portion of float 70 by supports 72 and 72' so as to avoid entry of air and loss of flow. In this position, air vent 36 is positioned substantially vertically, to rotate as float 70 subsides, but to never go below the top level of drain head 50.

As briefly noted above, three factors provided in the invention skimmer device contribute to flow control so as to enable gradual and thorough removal of water from sediment basin 14. The flow rate is affected by the differential internal diameter between control pipe 30 and flow pipe 34 as well as the diameter of orifice 44 within drain head 50, and also whether air vent 36 is open. The inside diameters of flow pipe 34 and control pipe 30 are preferably 7.6 cm. (3 inches) and 5.1 cm. (2 inches) respectively, according to the preferred embodiment. Flow rate values to accomplish the desired drainage of a particular sediment basin will depend upon many factors, including depth D of drain head 50 below the water surface, the size of orifice 44, sediment basin capacity, etc. Some approximate typical flow values are noted in the chart below, as derived by calculation:

| Orifice Diameter | Flow At 2 Inch Depth D | Flow Rate At 4 Inch Depth D |
| --- | --- | --- |
| .75 inch | 0.3 cfm | 0.5 cfm |
| 1.50 inch | 1.4 cfm | 2.0 cfm |
| 3 inch | 5.7 cfm | 8.1 cfm |
| 4 inch | 10.0 cfm | 14.2 cfm |

As will be understood by those skilled in the art, a properly controlled rate of water flow is beneficial to removal of water with the lowest sediment concentration, thus retaining the mud residue on the bottom of sediment basin 14. A flow rate considered acceptable is approximately gauged to drain a full sediment basin in 1–4 days, preferably about 2 days, regardless of its volume. Thus, the size of orifice 44 will have to be changed, by replacing plug 40 with another plug having an orifice diameter different than the diameter of orifice 44, according to the volume of sediment basin 14. In this way, the majority of suspended mud drops to the basin bottom and full drainage of water occurs (in normal circumstances) before another rain. It has been known to distribute powdered gypsum over the water surface as a flocculent to aid in precipitation. Loop 78 (FIGS. 2, 4 and 7) is provided to connect a rope or hook and move skimmer device 20 to the side. Ultimately, the mud is to be dried and excavated from the bottom of the sediment basin and relocated to an area for use or proper disposal. The sediment basin thus dredged is useful for repetitive cycles.

While the invention has been described with reference to specific embodiments thereof, it will be appreciated that numerous variations, modifications, and embodiments are possible, and accordingly, all such variations, modifications, and embodiments are to be regarded as being within the spirit and scope of the invention.

What is claimed is:

1. A skimmer device for removing water from a sediment basin provided for sediment control, said skimmer device comprising:

(a) a float adapted for floating in water collected in said sediment basin;

(b) a drain head having a plurality of openings for passing said water and supported by and below said float so as to reside proximally below the surface of said water in said sediment basin;

(c) an assembly of outlet pipes connected to said drain head at a first end of said outlet pipes and flexibly connectable to a drain line at a second end of said outlet pipes, said drain line being connected to a water removal facility, said outlet pipes include a flow pipe;

(d) said flow pipe having a constricted inside diameter portion, a water inlet orifice positioned within said flow pipe and an air vent mounted to said outlet pipes adjacent said first end thereof in a manner so that an upper open end of said air vent resides above the surface of said water and adapted for selectively being opened and closed;

(e) means for preventing debris larger than a selected size from entering said drain head; and (f) means for supporting said drain head below said float in a manner enabling said outlet pipes and said drain head to rotate with respect to said float between a first position and a second position.

2. The skimmer device as described in claim 1, wherein said water inlet orifice is formed in a plug removeably insertable in said first end of said outlet pipes.

3. The skimmer device of claim 1, wherein said drain head comprises screens of a selected grid size positioned adjacent selected of said plurality of openings.

4. The skimmer device as described in claim 1, wherein said float is of sufficient weight to prevent said drain head from being lifted above the surface of said water in the presence of a buoyant force of air maintained in said outlet pipes from said air vent.

5. A skimmer device for the removal of water collected in a sediment basin from the upper layer thereof, said skimmer device comprising:

(a) a float configured so as to substantially encompass a substantially open area and having a gap between a pair of opposed ends thereof;

(b) a first support connected to a selected location on said float so as to extend downwardly therefrom;

(c) a second support connected to a second location on said float so as to extend downwardly therefrom;

(d) a drain head having two opposed ends and a member at each end rotatably engaging said first and second support respectively;

(e) a first pipe having a first diameter and connected at a first end thereof in substantially perpendicular relation to said drain head intermediate said two ends thereof;

(f) a second pipe having a second diameter and connected co-axially to said first pipe at a second end thereof;

(g) a third pipe connected at a first end thereof to said second pipe at a position adjacent said second end of said first pipe and at an upwardly directed acute angle to said second pipe to terminate with an open end;

(h) a fourth pipe having a third diameter and being co-axially connected to said second pipe at a location distal from said first pipe, said third diameter being smaller than said second diameter;

(i) a flexible connector connected at a first end co-axially to said fourth pipe and connectable at a second end to a drain connection for removing said water;

(j) a debris guard mounted to said opposed ends of said float adjacent said gap in said float and biased to substantially close said gap when said drain head with said connected pipes are in a first orientation and to substantially open said gap when said drain head with said connected pipes are in a second orientation; and (k) flow control means assembled to said first pipe for controlling a rate of flow of water through said first pipe.

6. The skimmer device of claim 5 wherein said drain head comprises:

(a) a frame formed of a tube having a pair of openings formed therein for receiving water and a third opening for engaging said first pipe;

(b) a pair of screens formed to snugly enter said frame and substantially cover each of said pair of openings;

(c) means for releasably securing said first pipe to said drain head; and (d) a pair of closures for closing the ends of said tube.

7. The skimmer device of claim 6, wherein said frame further comprises an opening located substantially opposite to said first pipe for interchanging said flow control means for controlling rate of flow of water and having a slidably removable cover adapted for closing said opening.

8. A skimmer device for removing water from a sediment basin provided for sediment control, said skimmer device comprising:

(a) a float adapted for floating in water collected in said sediment basin;

(b) drain head having a plurality of openings for passing said water and being supported by and below said float so as to reside proximally below the surface of said water in said sediment basin;

(c) an outlet pipe connected to said drain head at a first end and flexibly connectable to a drain line at a second end, said drain line being connected to a water removal facility;

(d) means for controlling a rate of flow of said water through said outlet pipe;

(e) a debris guard formed of a perforate member pivotally mounted on said float substantially between a pair of closed ends defining a gap therein in a manner to permit said outlet pipe to move from an orientation at an acute angle with relation to said water surface with said debris guard closed to an orientation substantially parallel to said surface of said water with said outlet pipe substantially between said closed ends and said debris guard open sufficiently to contact said portions of said outlet pipe; and (f) means for supporting said drain head below said float in a manner enabling said outlet pipe and said drain head to rotate with respect to said float between a first position and a second position.

9. The skimmer device as described in claim 8, wherein said means for controlling a rate of flow includes an air vent connected at a first end to said outlet pipe and configured and positioned so that a second end thereof resides above the surface of water in said sediment basin.

10. The skimmer device as described in claim 8, wherein said debris guards are biased to be normally closed.

* * * * *